(12) United States Patent
Loo

(10) Patent No.: US 8,566,482 B2
(45) Date of Patent: Oct. 22, 2013

(54) METHOD AND SYSTEM FOR COMMUNICATING DISPLAYPORT AND SINGLE-LINK DVI/HDMI INFORMATION FOR DUAL-MODE DEVICES

(75) Inventor: Edward Khin Wui Loo, Vancouver (CA)

(73) Assignee: Icron Technologies Corporation, Burnaby, BC (CA)

( * ) Notice: Subject to any disclaimer, the term of this patent is extended or adjusted under 35 U.S.C. 154(b) by 5 days.

(21) Appl. No.: 13/342,332

(22) Filed: Jan. 3, 2012

(65) Prior Publication Data

US 2012/0173769 A1 Jul. 5, 2012

Related U.S. Application Data

(60) Provisional application No. 61/429,674, filed on Jan. 4, 2011.

(51) Int. Cl.
*G06F 3/00* (2006.01)

(52) U.S. Cl.
USPC .......................................................... 710/14

(58) Field of Classification Search
USPC .......................................... 710/313, 315, 14
See application file for complete search history.

(56) References Cited

U.S. PATENT DOCUMENTS

| | | | |
|---|---|---|---|
| 7,694,027 B2 | 4/2010 | Montag | |
| 7,727,027 B2 | 6/2010 | Chiang et al. | |
| 2007/0239929 A1* | 10/2007 | Chen et al. | 711/103 |
| 2008/0040581 A1* | 2/2008 | Bink et al. | 712/218 |
| 2008/0111919 A1 | 5/2008 | Hao et al. | |
| 2010/0323761 A1* | 12/2010 | Yuasa | 455/559 |
| 2010/0328540 A1 | 12/2010 | Wu et al. | |
| 2011/0063501 A1* | 3/2011 | Bar-Niv et al. | 348/474 |
| 2011/0243035 A1 | 10/2011 | Hall et al. | |
| 2012/0063376 A1* | 3/2012 | Kambhatla et al. | 370/310 |

OTHER PUBLICATIONS

"[Speex-dev] ultra wide band packet questions", Sep. 24, 2005, http://lists.xiph.org/pipermail/speex-dev/2005-September/003723.html.*
VESA DisplayPort Standard, Version 1, Revision 1a, Jan. 11, 2008.*

* cited by examiner

*Primary Examiner* — Farley Abad
(74) *Attorney, Agent, or Firm* — Manelli Selter PLLC; Edward J. Stemberger

(57) ABSTRACT

A system and method for communicating DVI (digital visual interface) and HDMI (high-definition multimedia interface) information is provided. The system includes a local unit operable to produce a downstream request packet in reaction to received DVI or HDMI information from a video source device and to transmit the request packet to a remote unit via a first simplex channel of a communications link. The remote unit operates to produce an upstream reply packet in reaction to received DVI or HDMI information by the remote unit from a video sink device and to transmit the reply packet to the local unit via a communications link. The system allows greater distances and allows various communications mediums to be used between the source and sink, and can communicate DVI and HDMI information and other information via a variety of different communications links.

19 Claims, 10 Drawing Sheets

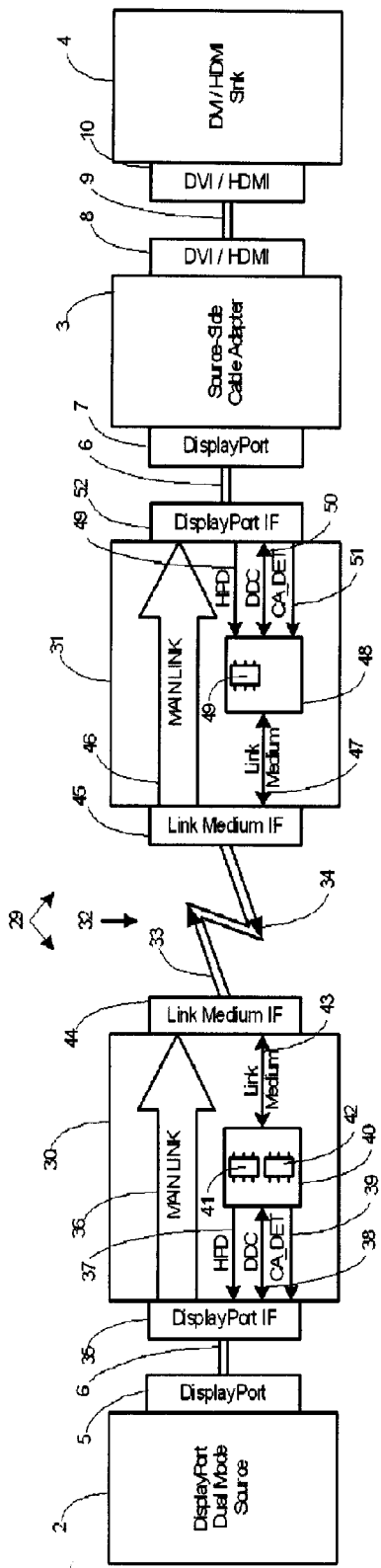
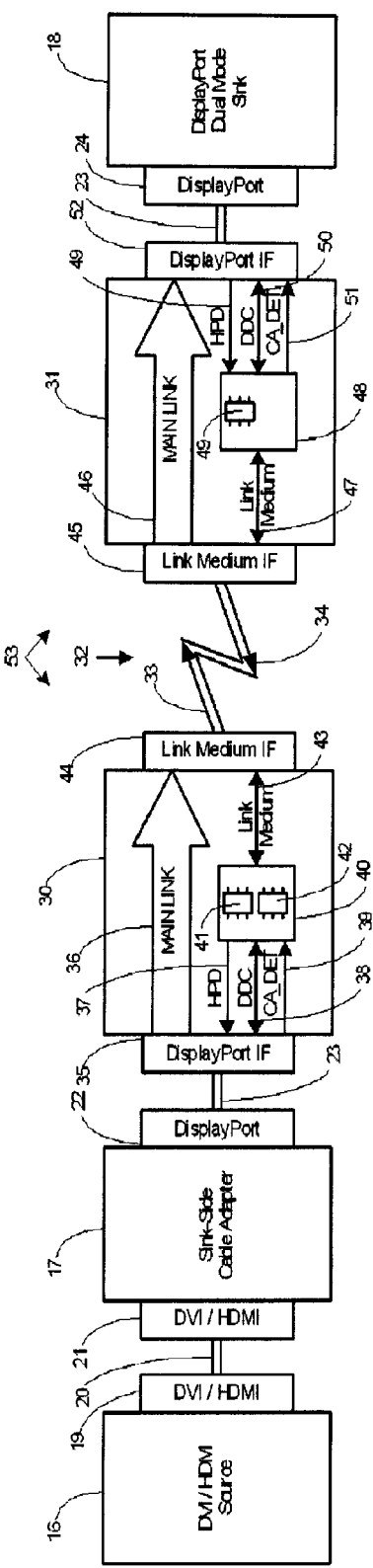
Fig. 3
Fig. 4

METHOD AND SYSTEM FOR COMMUNICATING DISPLAYPORT AND SINGLE-LINK DVI/HDMI INFORMATION FOR DUAL-MODE DEVICES

FIELD OF THE INVENTION

This invention relates to methods and system for communicating the DVI (digital visual interface) and HDMI (high-definition multimedia interface) Display Data Channel, Hot Plug Detect and Cable Adapter Detect signals for, and between, Dual-mode Devices (DisplayPort and DVI and/or HDMI) over a variety of link mediums and communication protocols.

DESCRIPTION OF THE PRIOR ART

The VESA (Video Electronics Standards Association) DisplayPort Standard defines a scalable digital display interface, with optional audio and content protection capabilities for broad applications within PC and consumer electronic (CE) devices. The DisplayPort interface is designed to support both internal chip-to-chip and external box-to-box digital display connections. Potential internal chip-to-chip applications include usage within a notebook PC for driving a panel from a graphics controller, or usage within a monitor or TV for driving the display component from a display controller, for example. Examples of box-to-box applications for DisplayPort interface connections include display connections between PCs and monitors, projectors, and TV displays. DisplayPort is also suitable for display connections between consumer electronics devices such as high-definition optical disc players, set top boxes, and television displays. The standard currently includes Version 1.1, 1.1a and 1.2 levels.

The DisplayPort Interoperability Guideline within the DisplayPort Standard was designed to realize interoperability between DisplayPort and other display interfaces (DVI, HDMI etc.) through the use of cable adapters. Devices that support both DisplayPort 1.1a and either DVI 1.0 or HDMI specifications are considered to be Dual-mode devices. Through the use of a cable adapter, a Dual-mode "source" device can interoperate with a DVI 1.0/HDMI "sink" device.

Similarly, through the use of a cable adapter, a DVI 1.0/HDMI source device can interoperate with a Dual-mode sink device.

There are two types of cable adapter defined by the guideline. In a first type of cable adapter, a source-side cable adapter is one in which a DisplayPort interface is presented on the source (upstream) side of the device and an alternative video interface is presented on the sink (downstream) side of the device. In a second type, a sink-side cable adapter is one in which a DisplayPort interface is presented on the sink (downstream) side of the device and an alternative video interface is presented on the source (upstream) side of the device.

When a cable adapter is implemented as a discrete unit, a source-side adapter can support a DisplayPort cable interface at its upstream port for attachment to a Dual-mode source device, and provides a DVI/HDMI cable interface at its downstream port for attachment to a DVI/HDMI sink device. In a similar manner, a sink-side adapter can support a DisplayPort cable interface at its downstream port for attachment to a Dual-mode sink device, and provides a DVI/HDMI cable interface at its upstream port for attachment to a DVI/HDMI source device.

In applicant's U.S. patent application Ser. No. 12/750,427, the contents of which are incorporated herein by reference, a method and system for communicating DisplayPort information was provided which enabled DisplayPort Auxiliary Channel information and Hot Plug Detect (HPD) information to be transmitted over a variety of link mediums with a variety of communication protocols. However, that application did not address a situation which would enable Dual-mode DisplayPort devices to operate over a variety of link mediums and with a variety of communication protocols.

Further, it should be noted that the prior art systems include a common dedicated wire that enables the source and sink device to determine shared timing information. Since such a dedicated wire is not available in the current application, it would be advantageous to be able to provide a substitute method for timing control.

SUMMARY OF THE INVENTION

The use of DisplayPort cable adapters enables DisplayPort devices to operate in a system with a variety of legacy devices such as those based upon the earlier DVI and HDMI standards. Accordingly, while the DisplayPort communication links and methods described in U.S. patent application Ser. No. 12/750,427 have proven useful in homogenous populations of DisplayPort devices, it would still be desirable to provide improvements to the technology to enable non-DisplayPort devices to be introduced to the system and to operate across a variety of link mediums and with a variety of communication protocols.

Accordingly, the current invention provides methods and apparatuses which enable the Display Data Channel (DDC), Hot Plug Detect (HPD) and Cable Adapter Detect (CA_DET) signals (from now on collectively referred to as "Dual-mode signals") to be packetized and communicated over various link mediums. In a preferred embodiment, the present invention also provides devices which will enable these Dual-mode signals to occupy, concurrently, the same link medium that is also occupied by foreign device information. Examples of such foreign device information include data communications from USB, Ethernet and other data communication protocols.

An advantage of the present invention's ability to allow connectivity to any suitable link medium is realized when, for example, a purely optical link is desired for all, or a portion of the link between a Dual-mode device and a Dual-mode cable adapter, either for electrical isolation or the desire to support longer transmission distances. In this situation, all of the main link pairs can be easily mapped to laser diodes to optically transmit on the source side, and photodiodes to receive on the cable adapter or sink side. The DDC, however, cannot be easily mapped to an optical interface because it is a half-duplex protocol. If DDC could be converted to a full-duplex link protocol then the ability to maintain a completely optical link in the data transmission connection, could be accomplished. Another advantage of the present invention's ability to allow connectivity to any suitable link medium is realized when Dual-mode signals are embedded into another communications protocol, such as Ethernet.

According to the present invention, a system for communicating video information in a Dual-mode environment includes: (i) a local unit for producing an incoming request packet in response to DVI or HDMI information, received by the local unit of the system (from either a DVI or HDMI or Dual-mode source device), and transmitting the incoming request packet to a remote unit of the system via a first simplex channel of a dual simplex communications link; and (ii) a remote unit for producing an incoming response packet in response to a DVI or HDMI or Dual-mode sink unit and transmitting the response packet to the local unit via a second simplex channel of the dual simplex communications link, wherein a communication link is provided between the local unit and the remote unit.

The local unit may optionally comprise a device for storing responses from the remote unit, and may also include a method to select response information stored at the local unit or response information received from the remote unit. The local unit may optionally include foreign device local transmitting means for producing foreign device downstream data in response to foreign device information received by the local unit from a foreign device and transmitting the foreign downstream data to the remote unit via the first simplex channel.

The remote unit may include remote outputting methods for outputting by the remote unit a representative DVI or HDMI information. The remote unit may include foreign remote transmitting means for producing foreign upstream data in response to foreign destination information received by the remote unit from a foreign destination device and transmitting the foreign upstream data to the local unit via the second simplex channel.

It is an objective of the present invention to provide methods and systems to provide a method of communicating Dual-mode Device data so that it can be packetized and distributed over various link mediums and lengths.

It is a further object of the present invention that the methods and system should preferably accommodate any transmission delays which are introduced by various link mediums and lengths.

It is a further object of the present invention that foreign device data, unrelated to Dual-mode data, may be transported across the link medium in addition to the Dual-mode data.

It is a further object of the present invention that the system may be connected to either a source-side cable adapter or a sink-side cable adapter.

It is a further object of the present invention that no changes are required to the DisplayPort source device or Dual-mode source device.

It is a further object of the present invention that no changes are required to the DisplayPort sink device or Dual-mode sink device.

It is a further object of the present invention that no changes are required to either the source-side cable adapter or the sink-side cable adapter.

It is a further object of the present invention that a plurality of DisplayPort devices and Dual-mode devices may be connected to the system.

As such, in a first aspect, the present invention provides a method for communicating DisplayPort dual-mode signals and information between an originating unit and a terminating unit across a communications link (which is preferably a dual simplex communication link), and through a DisplayPort dual-mode cable adapter, said method comprising:

a) receiving at a local unit, (DisplayPort) dual-mode signals from an originating unit;
b) converting at said local unit said received dual-mode signals into one or a plurality of request data packets;
c) transmitting at said local unit said one or a plurality of request data packets to a remote unit across said (dual simplex) communications link;
d) receiving at said remote unit said transmitted one or plurality of request data packets as one or a plurality of received request data packets;
e) converting at said remote unit said one or a plurality of received request data packets into converted dual-mode signals;
f) transmitting at said remote unit said converted dual-mode signals to a terminating unit;
g) receiving at said remote unit dual-mode signals from said terminating unit;
h) converting at said remote unit said received dual-mode signals into one or a plurality of response data packets;
i) transmitting at said remote unit said one or a plurality of response data packets to said local unit across said (dual simplex) communications link;
j) receiving at said local unit said transmitted one or a plurality of response data packets as one or a plurality of received response data packets;
k) converting at said local unit said one or a plurality of received response data packets into converted dual-mode signals; and
l) transmitting at said local unit said converted dual-mode signals to said originating unit,
wherein, when said Cable Adapter is a Source Side Cable Adapter, said terminating unit includes said cable adapter, and when said cable adapter is a Sink-Side Cable Adapter, said originating unit includes said cable adapter.

The originating unit is typically a DisplayPort Source device or a DVI/HDMI Source device, and the terminating unit is typically a DisplayPort Sink device or a DVI/HDMI Sink device, and the cable adapter can be a Source-Side Cable adapter, or a Sink-Side Cable adapter. When the terminating unit is a DVI/HDMI sink, a Source-Side Cable Adapter is used, and both the local unit and remote units are placed between the originating unit, and the cable adapter.

When the originating unit is a DVI/HDMI source, a Sink-Side Cable Adapter is used, and the local and remote units are both placed between the cable adapter, and the terminating unit.

The local unit is always placed so as to be closer to the originating device than the remote device.

In a further aspect, the present invention also provides a system for communicating DisplayPort dual-mode signals and information between an originating unit and a terminating unit across a preferably, dual simplex communications link, in accordance with the method described hereinabove, said system comprising:

a) a local unit comprising a local controller operable to:
a) receive from an originating unit dual-mode signals;
b) convert said received dual-mode signals into one or a plurality of request data packets;
c) transmit said one or a plurality of request data packets to a remote unit across said (dual simplex) communications link;
d) receive one or a plurality of response data packets from said remote unit across said (dual simplex) communications link;
e) convert said received one or a plurality of response data packets into converted dual-mode signals; and
f) transmit said converted dual-mode signals to said originating unit; and
b) a remote unit comprising a remote controller operable to:
a) receive said one or a plurality of request data packets from said local unit across said (dual simplex) communications link;
b) convert said received one or plurality of request data packets into converted dual-mode signals;
c) transmit said converted dual-mode signals to a terminating unit;
d) receive from said terminating unit dual-mode signals;

e) convert said received dual-mode signals into said one or a plurality of response data packets; and f) transmit said one or a plurality of response data packets across said dual simplex communications link.

The local and remote units are preferably connected one to the other, by a dual simplex communications link, although other communication links might also be used.

In a still further aspect, the present invention also provides a computer program product comprising computer-executable instructions embodied in a computer-readable medium for controlling one or more processors of a local unit connected to a remote unit via a preferably dual simplex, communications link, (the dual simplex communications link preferably having first and second simplex channels) to carry out the following steps:

a) Receiving dual-mode signals from an originating unit;

b) Producing a request data packet in response to said dual-mode signals;

c) Storing dual-mode information in memory;

d) Determining whether to produce and output to said originating unit stored dual-mode information stored in memory or to transmit said request data packet to the remote unit via the first simplex channel;

e) Receiving a response data packet from the remote unit via the second simplex channel;

f) Producing dual-mode signals in response to said response data packet and outputting to said originating unit said dual-mode information;

g) Receiving foreign information from a foreign source device;

h) Producing foreign request data packets in response to said foreign information; and i) Transmitting said foreign request data packets to the remote unit via the first simplex channel.

Similarly, the present invention also provides a computer program product comprising computer-executable instructions embodied in a computer-readable medium for controlling one or more processors of a remote unit connected to a local unit via a preferably dual simplex communications link (the dual simplex communications link having first and second simplex channels), to carry out the following steps:

a) Creating read requests and outputting said requests to a terminating unit;

b) Transmitting the responses to said read requests to the local unit via the second simplex channel;

c) Receiving request data packets from said local unit via the first simplex channel;

d) Producing dual-mode signals in response to said request data packets from said local unit;

e) Outputting said dual-mode signals to a terminating unit;

f) Receiving dual-mode signals from said terminating unit;

g) Producing a response data packet in response to said dual-mode signals;

h) Transmitting said response data packet to the local unit via the second simplex channel;

i) Receiving foreign request data packets from the local unit via the first simplex channel;

j) Producing foreign information in response to said foreign request data packets; and k) Outputting said foreign information to a foreign destination device.

DESCRIPTION OF THE PREFERRED EMBODIMENTS

A preferred embodiment of the present invention is its application in a video display environment. As such, details of the invention will be described with particular reference to video communication systems. However, the skilled artisan will appreciate that the system of the present invention might also be used in non-video applications.

In one preferred embodiment of a video communication system of the present invention, the video source device can be any standard unit or device that supports the DisplayPort Dual-mode specifications, such as computer graphics cards or video adapters. Preferably the unit or device shall support the most recent version of the DisplayPort Dual-mode specifications, but units or devices that support only early versions of the DisplayPort Dual-mode specifications are also permissible.

In a further preferred embodiment of a video communication system, the video sink device can be any standard unit or device that supports the DisplayPort Dual-mode specifications, such as computer monitors, TVs, projectors, or other video displays. Preferably the unit or device shall support the most recent version of the DisplayPort Dual-mode specifications, but units or devices that support only early versions of the DisplayPort Dual-mode specifications are also permissible.

In one preferred embodiment of a duplex communications link, the duplex communications link is a point-to-point link connected between a local proxy unit and a remote proxy unit.

In a further embodiment of a duplex communications link, the duplex communications link is comprised of a shared network that may carry other traffic in addition to the DisplayPort Dual-mode traffic travelling between the source device and the sink device. Networks such as those based on wired Ethernet, wireless Ethernet, the public Internet, private intranets and combinations of these networks are, for example, suitable for this application.

In a yet further embodiment of a duplex communications link, the duplex communications link can, when required, operate in half-duplex mode wherein information may be transmitted in only one direction at a time.

In a yet further embodiment of a duplex communications link, the duplex communications link can operate in full-duplex mode wherein information may be transmitted in both directions at the same time.

BRIEF DESCRIPTION OF THE DRAWINGS

Embodiments of this invention will now be described by way of example only in association with the accompanying drawings in which:

FIG. 3 is a block diagram of a system in accordance with the present invention, for communicating video information between a source device compatible with the DisplayPort specifications for Dual-mode devices and a sink device that is not compatible with the DisplayPort Specifications across a dual-simplex communication link;

FIG. 4 is a block diagram of a system for communicating video information between a source device that is not compatible with the DisplayPort specifications and a sink device compatible with the DisplayPort Specifications across a dual-simplex communication link, according to the current invention;

DETAILED DESCRIPTION OF THE INVENTION

Figure 1:
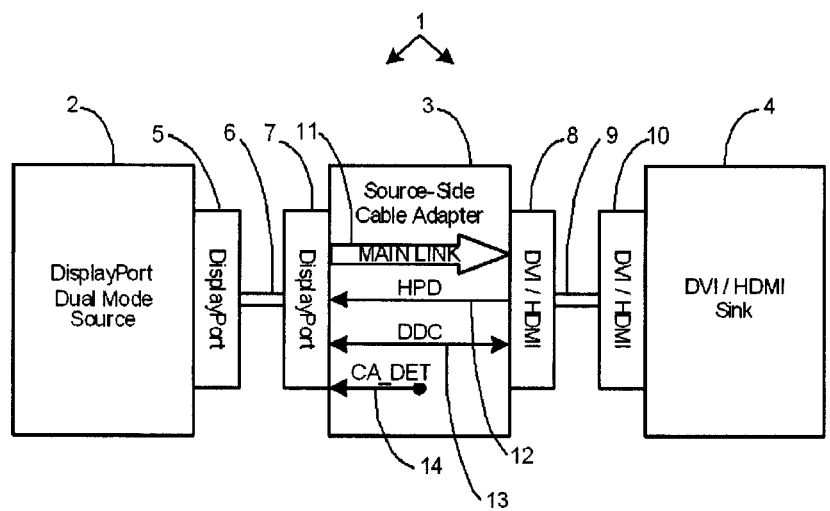
FIG. 1 is a block diagram of a video communication system incorporating a source-side cable adapter in a Dual-mode environment according to the prior art.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

In the drawings, FIG. 1 provides a prior art block diagram showing a Dual-mode environment (1), consisting of a DisplayPort Dual-mode source device (2) connected to a DVI or HDMI sink device (4) through a source-side cable adapter (3). The Dual-mode source device (2) contains a DisplayPort connector (5) which connects to a DisplayPort connector (7) of the source-side cable adapter (3) through a DisplayPort Cable (6). The DVI or HDMI sink device (4) contains a DVI or HDMI connector (10) which connects to the DVI or HDMI connector (8) of source-side cable adapter (3) through a DVI or HDMI cable (9). Upon attaching the source-side cable adapter (3) to the Dual-mode source device (2), the Cable Adapter Detect (CA_DET) signal (14) is asserted to indicate to the source device (2) that it is attached to the cable adapter (3) and that the source device is required to operate by transacting DVI or HDMI information (Display Data Channel (DDC) data and DVI/HDMI video stream). Upon attaching the DVI or HDMI sink device (4) to the cable adapter (3), the Hot Plug Detect (HPD) signal (14) is asserted to indicate that the sink device is attached. The HPD signal is passed through to the source device (2). The source device (2) may transact Display Data Channel (DDC) information through pass-through DDC signals (13) in the cable adapter (3) to the sink device (4) and will transmit video information through the pass-through main link (11) in the cable adapter (3) to the sink device (4).

Figure 2:
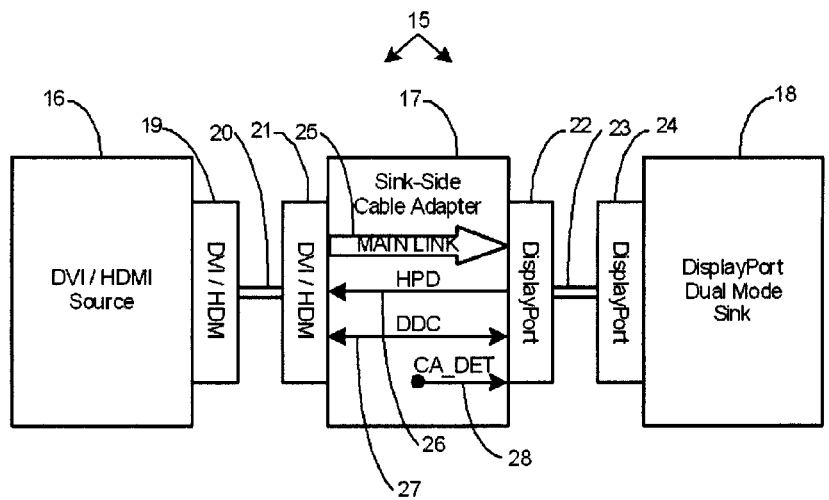
FIG. 2 is a block diagram of a video communication system incorporating a sink-side cable adapter in a Dual-mode environment according to the prior art.

FIG. 2 provides a prior art block diagram showing an alternate Dual-mode environment (15), consisting of a DVI or HDMI source device (16) connected to a DisplayPort Dual-mode sink device (18) through a sink side cable adapter (17). The Dual-mode sink device (18) contains a DisplayPort connector (24) which connects to the DisplayPort interface (22) of the sink-side cable adapter (17) through a DisplayPort Cable (23). The DVI or HDMI source device (16) contains a DVI or HDMI connector (19) which connects to the DVI or HDMI interface (21) of sink-side cable adapter (17) through a DVI or HDMI cable (20). Upon attaching the sink-side cable adapter (17) to the Dual-mode sink device (18), the CA_DET signal (28) is asserted to indicate to the sink device (18) that it is attached to a cable adapter (17) and that the sink device is required to operate by transacting DVI or HDMI information. At this time, the HPD signal (26) is asserted to indicate a sink device is attached. The HPD signal is passed through to the source device (16). The source device (16) may transact DDC information through pass-through DDC signals (27) in the cable adapter (17) to the sink device (18) and will transmit video information through the pass-through main link (25) in the cable adapter (17) to the sink device (18).

Referring to FIG. 3, the system according to a first embodiment of the invention is shown generally at (29). The system (29) functions to communicate DVI or HDMI information along a communications link (32). The communications link (32) may be any wired or wireless connection suitable for transmitting data or other electronic signals, and may include a copper wire link, a coaxial cable link, a fiber-optic transmissions link, a radio link, a cellular telephone link, a satellite link, a line-of-sight free optical link, and any combination thereof, for example. Preferably, the communications link (32) permits simultaneous two-way communications, such as by implementing a full-duplex or dual simplex medium. The communications link (32) is shown as implementing a dual simplex medium having one channel (33) intended for one-way communications in one direction and another channel (34) intended for one-way communication in the opposing direction.

System (29) includes a local proxy unit (LPU) (30) and a remote proxy unit (RPU) (31) operable to effect communications between each other via the communications link (32). In this context, the term "local" refers to the unit closest to the source device, and the term "remote" refers to the unit closest to the sink device, regardless of the positioning of the cable adapter (source-side or sink-side).

In the first embodiment, the invention advantageously permits, over the prior art system shown in FIG. 1, the communication of Dual-mode signals (DVI or HDMI information) between a DisplayPort Dual-mode source device (2) and a DVI or HDMI sink device (4) via a source-side cable adapter (3) which may be separated from the Dual Mode Source (2) by a distance beyond current specifications; advantageously permits the communication of Dual-mode signals between the DisplayPort Dual-mode source device (2) and DVI or HDMI sink device (4) via a source-side cable adapter (3) via one or more of a variety of different types of communications links (32); or both advantageously permits the communication of Dual-mode signals over a distance beyond current specifications and via a variety of different types of communications link (32).

In more detail, the DVI/HDMI sink device (4) is attached to the source-side cable adapter (3) via the DVI/HDMI connectors (10 & 8) on both respective devices with a DVI/HDMI cable (9). The source-side cable adapter (3) is connected to the RPU (31) by a DisplayPort Connector (7) attached to the source-side cable adapter (3), through a DisplayPort cable (6) to the DisplayPort interface (52) located on the RPU (31). The RPU (31) consists of the remote main link channel (46), the remote Hot Plug Detect (HPD) channel (49), the remote Display Data Channel (DDC) (50), the remote Cable Adapter Detect (CA_DET) channel (51), the remote controller (48), and the link medium channel (47).

The remote link medium channel (47) bi-directionally directs link medium information signals such as link medium data between the remote link medium interface (45) and the remote controller (48).

The remote controller (48) includes a remote processor (49) which functions to control features and implement methods of the system, including converting the format of data between DVI/HDMI information and that of a protocol specific to a given communications link Preferably, the LPU (30) and RPU (31) operate compatibly such that the remote controller (48) converts request packets from the LPU (30) into the appropriate format to be outputted at the remote DisplayPort interface (52). The remote controller also functions to convert the information present at the remote DisplayPort interface (52) (such as DDC, HPD, or CA_DET) into a response packet format specific to a given communications link (32).

The LPU (30) connects to the communications link (32) by means of a local link medium interface (44). The local link medium channel (43) bi-directionally directs link medium information signals such as link medium data between the local link medium interface (44) and the local controller (40). The LPU (30) also consists of the local main link channel (36), the local HPD channel (37), the local DDC (38) and the CA_DET channel (39). The local controller (40) includes a local processor (41) which functions to control features and implement methods of the system, including converting the format of data between DVI/HDMI information and that of a protocol specific to a given communications link (32). The local controller (40) also functions to convert the information present at the local DisplayPort interface (35) (such as DDC or CA_DET) into a request packet format specific to a given communications link (32). The local controller (40) also includes a local memory (42) which stores response data sent by the RPU (31). The local processor (41) may retrieve data from the memory to send to the local DisplayPort interface (35).

Upon connection of the RPU (31) to the source-side cable adapter (3), the source-side cable adapter (3) indicates over the remote CA_DET channel (51) via the DisplayPort interface (52) that a cable adapter is present. The remote controller (48) creates a CA_DET event packet to be transmitted through the communications link (32) via the remote link medium channel (47) and the remote link medium interface (45). The local controller (40) within LPU (30) receives the CA_DET event packet via the local link medium channel (43) and local link medium interface (44) and indicates on the local CA_DET channel (39) that a cable adapter is present. This signal is transmitted to the DisplayPort Dual-mode source device (2) via the DisplayPort connector (5), source side DisplayPort cable (6) and local DisplayPort interface (35).

Upon connection of the DVI/HDMI sink device (4) to the system (29), the sink device (4) indicates, through source-side cable adapter (3), and then to the remote HPD channel (49) that a sink device is present. The remote controller (48) creates a HPD event packet to be transmitted through the communications link (32) via the remote link medium channel (47) and the remote link medium interface (45). The local controller (40) within LPU (30) receives the HPD event packet via the local link medium channel (43) and local link medium interface (44) and indicates on the local HPD channel (37) that a DVI/HDMI sink device is present. This signal is transmitted to the DisplayPort Dual-mode source device (2).

It should be noted that the local DDC (38) directs DDC data and DDC clock signals bi-directionally between the local DisplayPort interface (35) and the local controller (40). However, the local controller (40) preferably can implement clock stretching by holding the DDC clock low, dependant on the type of DDC transaction, in order to allow the local controller (40) to create a request packet to be transmitted through the communications link (32) via the local link medium channel (43) and the local link medium interface (44). The remote controller (48) within RPU (31) receives the request packet from the LPU (30) via the communications link (32), the remote link medium interface (45) and the remote link medium channel (47). The remote controller (48) converts the request packet into DDC data format and transmits the information to the remote DisplayPort interface (52) via the remote DDC (50). The remote controller (48) receives information from the remote DisplayPort interface (52) and converts the information into a response packet. The response packet is directed to the remote link medium interface (45) via the remote link medium channel (47). The local controller (40) within LPU (30) receives the response packet from the RPU (31) via the communications link (32), the local link medium interface (44) and the local link medium channel (43). The local controller (40) disables the DDC clock stretching and converts the response packet into DDC data format and transmits the information to the local DisplayPort interface (35) via the local DDC (38).

Additionally, the remote controller (48) within RPU (31), upon receiving an indication over the remote HPD channel (49) that a sink device is present, may create DDC read commands to send to the sink device in order to read static DDC information. The remote controller (48) receives responses to these read commands and generates response packets to be transmitted to the LPU (30). The LPU (30) receives these packets via the communications link (32) and the local controller (40) stores this information in the local memory (42). Upon receiving DDC read commands at the local DisplayPort Interface (35) pertaining to this information, the local controller (40) may select the stored information in the local memory (42) and transmit the DCC information to the DisplayPort interface (35) via the local DDC (38).

The local main link channel (36) is operable to direct visual information signals in a downstream direction from the local DisplayPort interface (35) to a local link medium interface (44) of the LPU (30). For example, when the local DisplayPort interface (35) receives DVI/HDMI information from the DisplayPort Dual-mode source device (2) that includes an uncompressed digital packetized video stream according to the DVI/HDMI specification, the local DisplayPort interface

(35) directs such video stream to the local main link channel (36) for delivery to the local link medium interface (44). The remote main link channel (46) is operable to direct visual information signals in a downstream direction from the remote link medium interface (45) to a remote DisplayPort interface (52) of the RPU (31). By way of example, when the RPU (31) receives the video stream from the LPU (30) via the communications link (32), the remote link medium interface (45) directs the video stream to the remote main link channel (46) for delivery to the remote DisplayPort interface (52).

Referring to FIG. 4, a system according to a second embodiment of the invention is shown generally at (53). The second embodiment of the invention advantageously, over the prior art system shown in FIG. 2, permits the communication of Dual-mode signals (DVI or HDMI information) between a DVI/HDMI source device (16) and a DisplayPort Dual-mode sink device (18) via a sink-side cable adapter (17) which may be separated by a distance beyond current specifications; advantageously permits the communication of Dual-mode signals between the DVI/HDMI source device (16) and DisplayPort Dual-mode sink device (18) via a sink-side cable adapter (17) via one or more of a variety of different types of communications links (32); or both advantageously permits the communication of Dual-mode signals over a distance beyond current specifications and via a variety of different types of communications link (32).

In more detail, the DVI/HDMI source device (16) is attached to the sink-side cable adapter (17) via the DVI/HDMI connectors (19 & 21) on both respective devices with a DVI/HDMI cable (20). The sink-side cable adapter (17) is connected to the LPU (30) by a DisplayPort Connector (22) attached to the sink-side cable adapter (17), through a DisplayPort cable (23) to the DisplayPort interface (35) located on the LPU (30). The LPU (30) and RPU (31) each consist of the same elements as described in FIG. 3.

The CA_DET channels (39 & 51) on the LPU and RPU operate differently compared to the embodiment shown in FIG. 3. In this embodiment, upon connection of the LPU (30) to the sink-side cable adapter (17), the cable adapter indicates over the CA_DET channel (39) that a cable adapter is present. The local controller (40) within LPU (30) creates a CA_DET event packet to be transmitted through the communications link (32) via the local link medium channel (43) and the local link medium interface (44). The remote controller (48) within RPU (31) receives the CA_DET event packet via the remote link medium channel (47) and remote link medium interface (45) and indicates on the remote CA_DET channel (51) that a cable adapter is present. This signal is transmitted to the DisplayPort Dual-mode sink device (18) via the DisplayPort connector (24), sink-side DisplayPort cable (23), and local DisplayPort Interface (52).

All other aspects of this embodiment operate in the same fashion as that shown and described in respect of FIG. 3.

Figure 5:
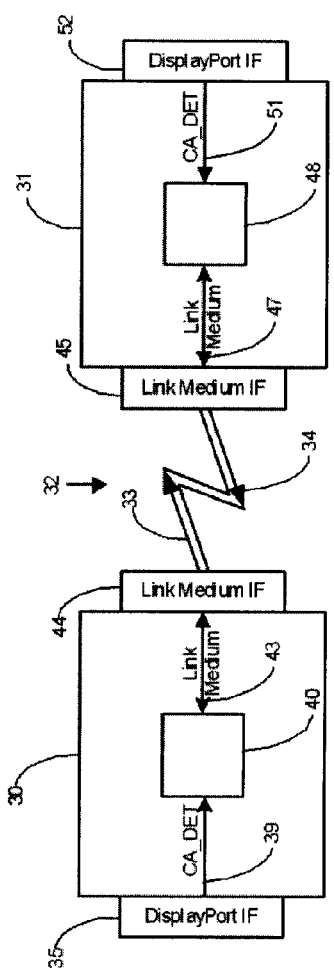
FIG. 5 is a block diagram showing the configuration of the cable-detect signals when no source or sink-side cable adapters are attached, according to the current invention.

FIG. 5 is a block diagram showing the configuration of the cable-detect signals when no source or sink-side cable adapters are attached, according to the current invention. Referring to FIG. 5, and as seen in FIGS. 3 and 4, the local and remote CA_DET channels (39 & 51) on the LPU (30) and RPU (31) are operable bi-directionally. When neither source-side cable adapter nor sink-side cable adapter is present at either local or remote DisplayPort interface (35 & 52), the local and remote CA_DET channels (39 & 51) are both configured in a default input direction towards the local and remote controllers (40 & 48).

Figure 6:
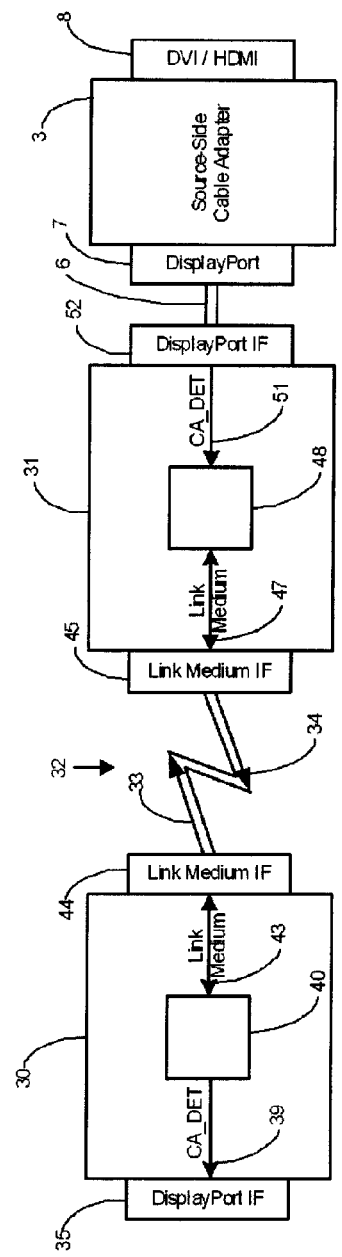
FIG. 6 is a block diagram showing the configuration of the cable-detect signals when a source-side cable adapter is attached to the downstream interface of the system, according to the current invention.

FIG. 6 is a block diagram showing the configuration of the cable-detect signals when a source-side cable adapter (3) is attached to the downstream interface of the system shown in FIG. 5. FIG. 6 depicts a source-side cable adapter (3) connected to the RPU (31) via DisplayPort connector (7), DisplayPort cable (6) and remote DisplayPort interface (52). The remote CA_DET channel (51) is asserted by the source-side cable adapter (3), and the remote controller (48) observes that a cable adapter is connected. The remote controller (48) generates and transmits a CA_DET event packet to the LPU (30) via the remote link medium channel (47) and remote link medium interface (45). The LPU (30) receives the CA_DET event packet via the communications link (32), local link medium interface (44) and local link medium channel (43). In response to the CA_DET event packet, the local controller (40) re-configures the local CA_DET channel (39) to an upstream output direction and indicates to the local DisplayPort interface (35) that a cable adapter is present.

Figure 7:
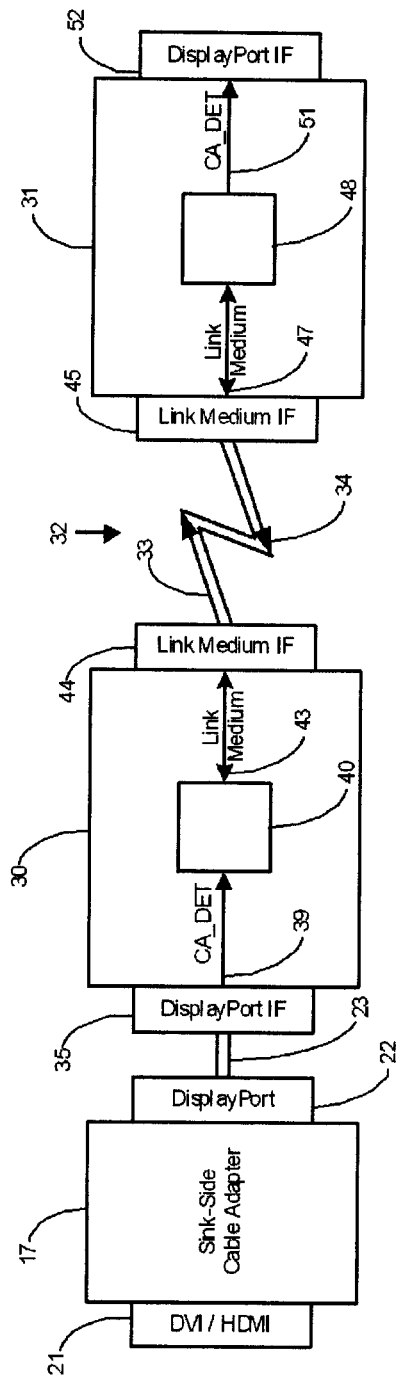
FIG. 7 is a block diagram showing the configuration of the cable-detect signals when a sink-side cable adapter is attached to the upstream interface of the system, according to the current invention.

FIG. 7 is a block diagram showing the configuration of the cable-detect signals when a sink-side cable adapter (17) is attached to the upstream interface of the system shown in FIG. 5. FIG. 7 depicts a sink-side cable adapter (17) connected to the LPU (30) via DisplayPort connector (22), DisplayPort cable (23) and local DisplayPort interface (35). The local CA_DET channel (39) is asserted by the sink-side cable adapter (17) and the local controller (40) observes that a cable adapter is connected. The local controller (40) generates and transmits a CA_DET event packet to the RPU (31) via the local link medium channel (43) and local link medium interface (44). The RPU (31) receives the CA_DET event packet via the communications link (32), remote link medium interface (45) and remote link medium channel (47). In response to the CA_DET event packet, the remote controller (48) re-configures the remote CA_DET channel (51) to an downstream output direction and indicates to the remote DisplayPort interface (52) that a cable adapter is present.

Figure 8:
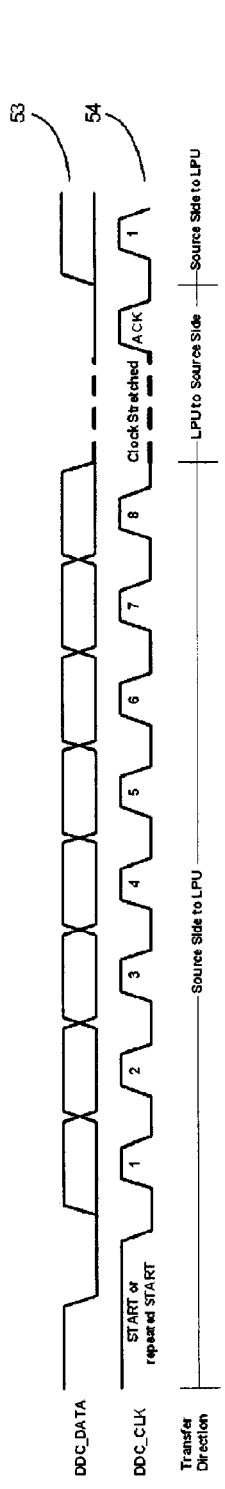
FIG. 8 is a timing diagram showing one method for stretching the DDC clock, according to the current invention.

FIG. 8 shows a timing diagram demonstrating a first instance of DDC clock stretching (as previously mentioned) as used by the local controller (40) in order to delay in responding to the source device. The source device (DVI/HDMI or DisplayPort Dual-mode source device) transmits data over the DDC data channel (53) over eight DDC clock (54) cycles. After the eight clock cycle, the DDC clock is driven by the local controller (40) which holds the DDC clock (54) low until it is ready to respond. When the local controller (40) is ready to respond, the local controller (40) drives the DDC clock (54) during the acknowledgement cycle of the DDC protocol while responding with an acknowledge or not-acknowledge signal over the DDC data channel (53). The source device is free to continue transmitting data to the LPU (30) only after the acknowledgement clock cycle, and as such, the timing of the transmission is stretched. This allows the transmission to continue even though delays (such as those caused by longer cable lengths than those allowed under the guidelines, may be used.

Figure 9:
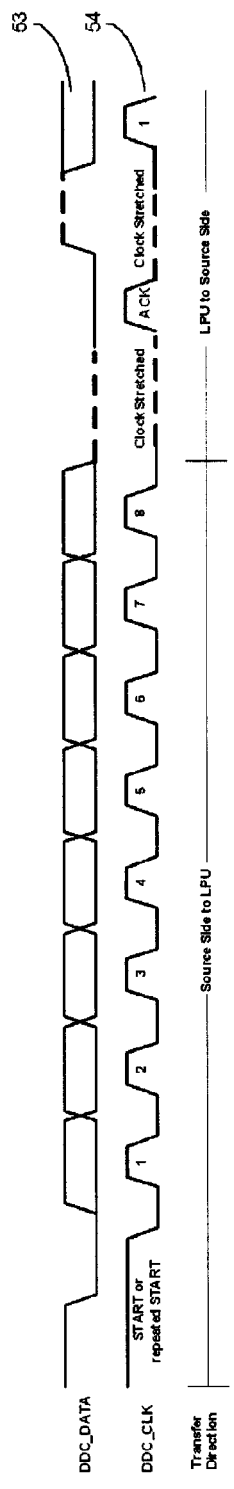
FIG. 9 is a timing diagram showing a second method for stretching the DDC clock, according to the current invention.

FIG. 9 shows a timing diagram demonstrating a second instance of DDC clock stretching used by the local controller (40) to delay in responding to the source device. The source device transmits data over the DDC data channel (53) over eight DDC clock (54) cycles. After the eight clock cycle, the DDC clock (54) is driven by the local controller (40) which holds the DDC clock (54) low until it is ready to respond. When the local controller (40) is ready to respond, the local controller (40) drives the DDC clock (54) during the acknowledgement cycle of the DDC protocol while responding with an acknowledge or not-acknowledge over the DDC data channel (53). The local controller (40) will hold the DDC clock (54) low until it is ready to respond again. When the local controller (40) is ready to respond, the local controller

(40) drives the DDC clock (54) and transmits data over the DDC data channel (53) to the source device.

Figure 10:
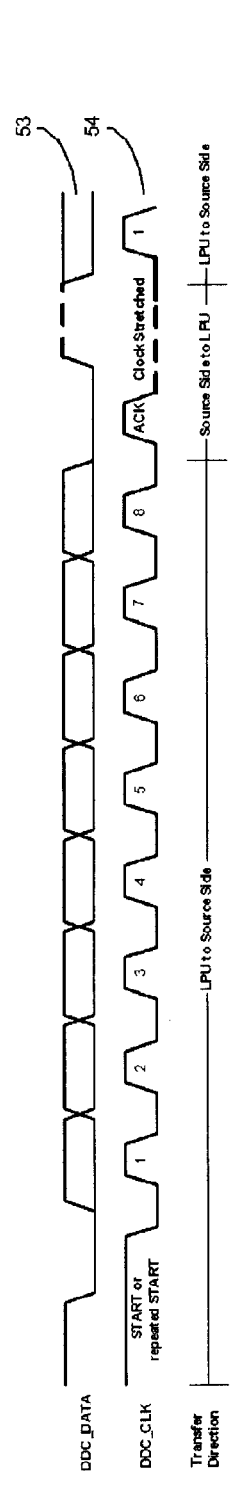
FIG. 10 is a timing diagram showing a third method for stretching the DDC clock, according to the current invention.

FIG. 10 shows a timing diagram demonstrating a third instance of DDC clock stretching used by the local controller (40) to delay in responding to the source device. The local controller (40) transmits data over the DDC data channel (53) over eight DDC clock (54) cycles to the source device and the source device transmits an acknowledge or not-acknowledge signal over the DDC data channel (53) during the acknowledgement cycle of the DDC protocol. After the acknowledgement cycle, the DDC clock is driven by the local controller (40) which holds the DDC clock (54) low until it is ready to respond. When the local controller (40) is ready to respond, the local controller (40) drives the DDC clock (54) and transmits data over the DDC data channel (53) to the source device.

Figure 11:
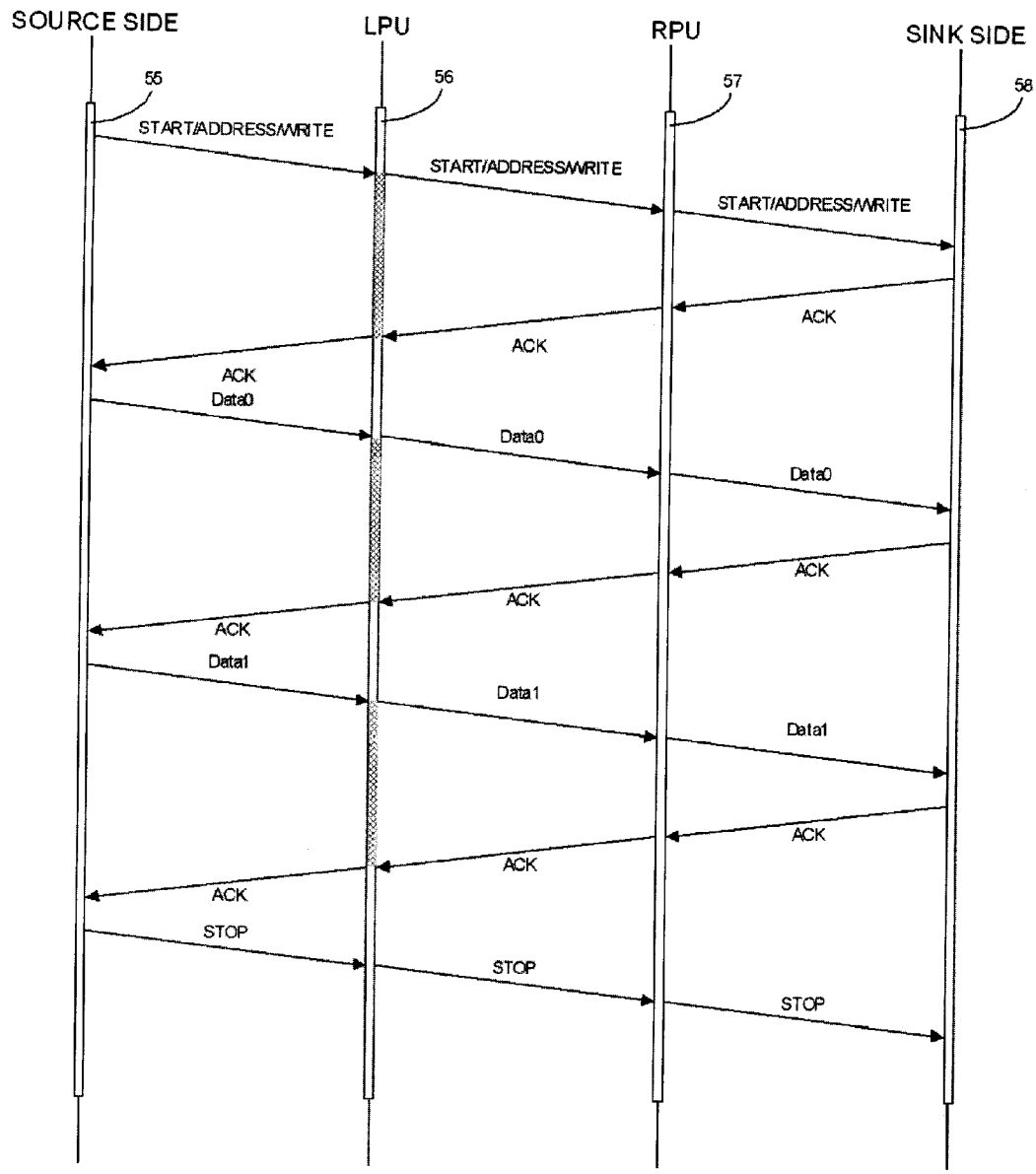
FIG. 11 is a sequence diagram showing a method for stretching the DDC clock during a Read transaction, according to the current invention.
Figure 12:
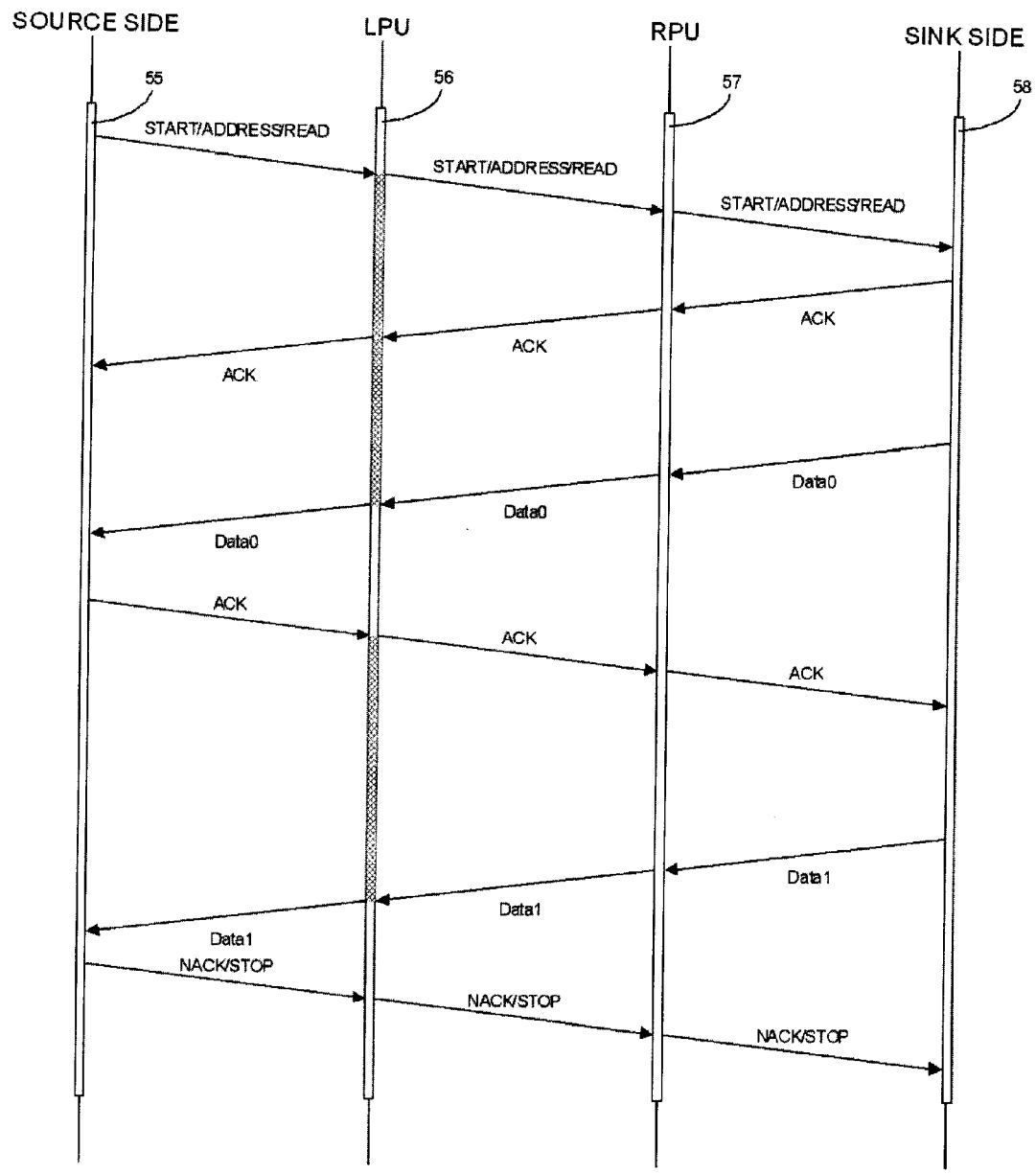
FIG. 12 is a sequence diagram showing a method for stretching the DDC clock during a Write transaction, according to the current invention.

The methods of the system with respect to the DDC component of the DVI/HDMI information are illustrated by way of sequence diagrams shown in FIGS. 11 & 12, in which passage of time is represented in the downward direction from top to bottom, and electronic communications between devices is represented by arrows in the horizontal or near horizontal direction from side to side of such sequence diagrams. In sequence diagrams of FIGS. 11 & 12, DDC signals present at the source device are indicated at various points along the vertical time axis (55) positioned directly beneath the "SOURCE SIDE" header. Similarly, DDC signals present at the LPU (30) are indicated at various points along the vertical time axis (56) positioned directly beneath the "LPU" header. Continuing similarly, DDC signals present at the RPU (31) are indicated at various points along the vertical time axis (57) positioned directly beneath the "RPU" header, and DDC signals present at the sink device are indicated at various points along the vertical time axis (58) positioned directly beneath the "SINK SIDE" header. The source device can be any DVI/HDMI source device (16) connected to a sink-side cable adapter (17) or a DisplayPort Dual-mode source device (2). The sink device can be any DVI/HDMI sink device (4) connected to a source-side cable adapter (3) or a DisplayPort Dual-mode sink device (18).

The sequence diagram shown in FIG. 11 demonstrates an example of a DDC write transaction according to the present invention. As indicated by the uppermost and leftmost arrow of FIG. 11, DDC information consisting of a DDC write command (START bit, ADDRESS, WRITE bit) is delivered to the LPU (30). The LPU (30) will drive the DDC clock (54) low as described in the first instance of DDC clock stretching shown in FIG. 8. Periods of DDC clock stretching are indicated on FIG. 11 by the hash markings on the LPU vertical time axis (56). The LPU (30) will transmit a DDC request packet to the RPU (31) over the link medium (32). The RPU (31) regenerates the original DDC information using proper DDC protocol and transmits it to the sink device. The sink device responds with an acknowledgement bit which the RPU (31) transmits to the LPU (30) in the form of a DDC response packet. The LPU (30), after receiving the response packet, drives the DDC clock (54) and transmits the original DDC information using proper DDC protocol to the source device. The source device continues by sending data to the LPU (30) which the LPU (30) creates and transmits a DDC request packet to the RPU (31). The LPU (30) repeats in driving the DDC clock (54) low, again as shown in FIG. 8. The RPU (31) continues to transmit DDC information to the sink device and creates DDC response packets in response to DDC information it receives from the sink device. This process of data transmission may continue indefinitely even though FIG. 11 displays only two data transmission by the source device. The transaction is terminated when a STOP is received by the LPU (30). DDC clock stretching is not implemented since it is not needed for the STOP information. The STOP information is send to the RPU (31) for transmission to the sink device, in the same manner described above.

The sequence diagram shown in FIG. 12 demonstrates an example of a DDC read transaction according to the present invention. As indicated by the uppermost and leftmost arrow of FIG. 12, DDC information consisting of a DDC read command (START bit, ADDRESS, READ bit) is delivered to the LPU (30). The LPU (30) will drive the DDC clock (54) low as described in the second instance of DDC clock stretching, as shown and described in FIG. 9. Periods of DDC clock stretching are indicated on FIG. 12 by the hash markings on the LPU vertical time axis (56). The LPU (30) will transmit a DDC request packet to the RPU (31) over the link medium (32). The RPU (31) regenerates the original DDC information using proper DDC protocol and transmits it to the sink device. The sink device responds with an acknowledgement bit which the RPU (31) transmits to the LPU (30) in the form of a DDC response packet. The LPU (30), after receiving the response packet, drives the DDC clock (54) and transmits the acknowledgment bit using proper DDC protocol to the source device. The DDC clock stretching is continued as specified in the second instance of DDC clock stretching. The sink device responds with DDC data which the RPU (31) transmits to the LPU (30) in the form of a DDC response packet. The LPU (30), after receiving this response packet, drives the DDC clock (54) and regenerates the DDC data using proper DDC protocol and transmits it to the source device. The LPU (30) receives an acknowledge bit from the source device and implements the third instance of clock stretching. The LPU (30) sends the acknowledge bit in the form of a DDC request packet to the RPU (31)). The RPU (31) regenerates the original DDC information using proper DDC protocol and transmits it to the sink device. The sink device responds with DDC data which the RPU (31) transmits to the LPU (30) in the form of a DDC response packet. This process of data transmission may continue indefinitely even though FIG. 12 displays only two data transmissions by the sink device. The transaction is terminated when a STOP or NACK is received by the LPU (30). DDC clock stretching is not implemented. The STOP information is send to the RPU (31) for transmission in the same manner described above.

Figure 13:
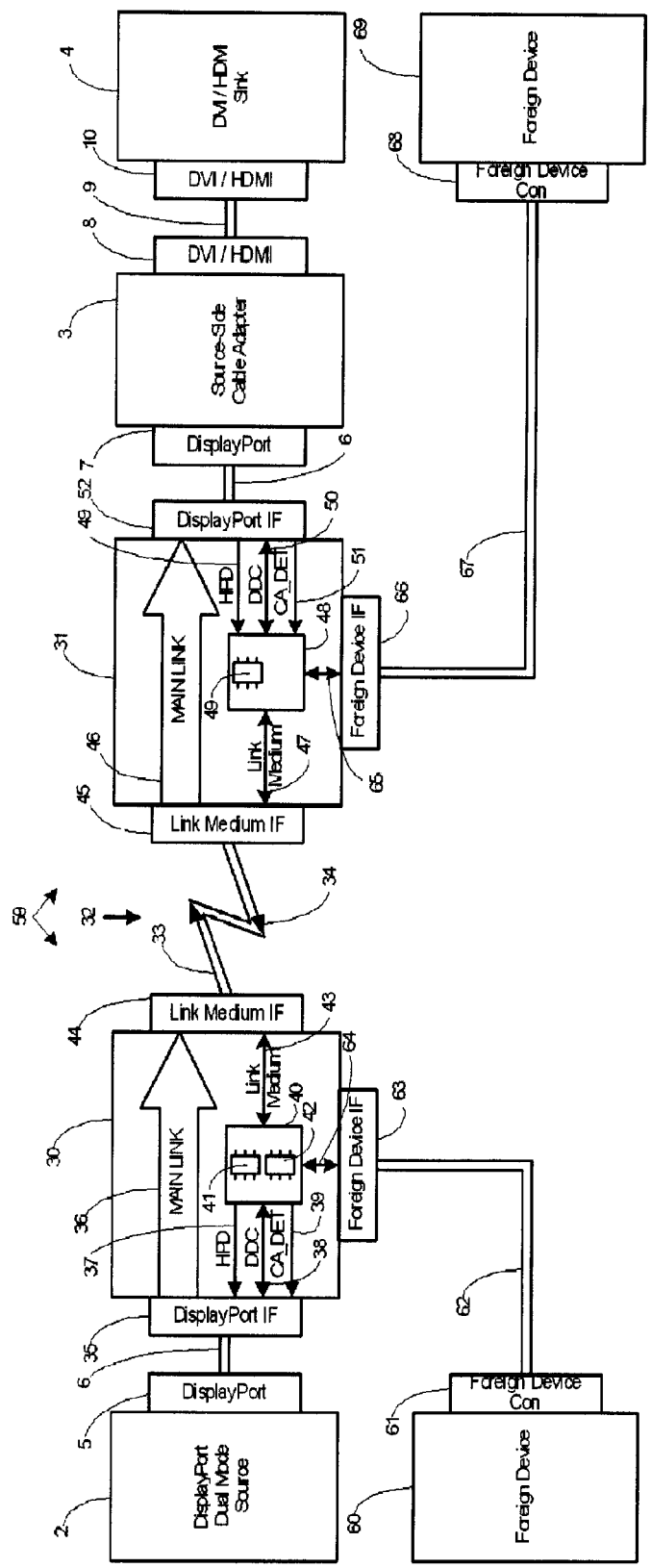
FIG. 13 is a block diagram of a system for communicating video information between a source device compatible with the DisplayPort specifications for Dual-mode devices and a sink device that is not compatible with the DisplayPort Specifications across a duplex communication link wherein foreign data may be combined with the DisplayPort Dual-mode signals, according to the current invention.

Referring to FIG. 13, the proxy features of the system advantageously permits the system to communicate foreign data communications (i.e. data communications which are non-compatible with the DisplayPort specification for Dual-mode devices) from foreign devices along the communications link (32). The DDC bandwidth, in some instances, requires 100 kbps, and the LPU (30), the communications link (32), and the RPU (31) are operable in some embodiments to communicate in accordance with a bandwidth greater than 100 kbps. However, the combined bandwidth of the local link medium channel (43), the communications link (32), and the remote link medium channel (47) in some embodiments is 720 Mbps or higher. Thus, the system advantageously permits the communication of both DVI/HDMI information and foreign device information along a common communications link, such as the communications link (32) shown in FIGS. 13 & 14.

Foreign information may be any information in a form compliant with any protocol, including USB (Universal Serial Bus) or other serial protocols, other parallel protocols, Ethernet, other standard communication protocols, custom communication protocols, or any combination thereof for example.

FIG. 13 is a block diagram of a system for communicating video information between a source device compatible with the DisplayPort specifications for Dual-mode devices and a sink device that is not compatible with the DisplayPort Specifications across a duplex communication link wherein foreign data may be combined with the DisplayPort Dual-mode signals, according to the current invention. FIG. 13 shows a system (59) demonstrating a further embodiment of the invention consisting of a DisplayPort Dual-mode source device (2), LPU (30), communications link (32), RPU (31), Source-side cable adapter (3), and DVI/HDMI sink device (4) as configured in a similar form to the embodiment shown in FIG. 3. Additionally, the system (59) consists of a local foreign device (60) and remote foreign device (69). The LPU (30) is operable to connect to a local foreign device (60) having a local foreign device connector (61) for receiving a local foreign cable (62). The local foreign device (60) can be any system capable of electronic communications. The local foreign cable (62) is shown in FIG. 13 being attached to the local foreign device interface (63) of the LPU (64). A local foreign channel (64) of the LPU (30) is operable to transfer foreign information between the local foreign device interface (63) and the local controller (40).

Also, a remote foreign channel (65) of the RPU (31) is connected between the remote controller (48) and a remote foreign device interface (66) of the RPU (31). The remote foreign device interface (66) is shown in FIG. 13 being attached to a remote foreign cable (67) which is received by the remote foreign device connector (68) of the remote foreign device (69).

Communications between the local and remote foreign devices (60 & 69) are not limited to one-way communications. In some instances, the system (59) is operable to communicate foreign information via the communications link (32) uni-directionally, uni-directionally in the opposite direction, or bi-directionally.

In the case of bi-directional communications, the local controller (40) is operable to receive foreign information from the local foreign channel (64) and produce one or more foreign packets in response to received foreign information. The local controller (40) transmits foreign packets to the RPU (31) via the communications link (32), which may include transmitting foreign packets by interleaving foreign packets and DVI/HDMI request packets. In addition, local controller (40) receives foreign packets from the local link medium channel (43) and produces representative foreign information in response to the received foreign packet received from the RPU (31) from the remote foreign device (69). The local controller (40) outputs the representative foreign information to the local foreign channel (64) for delivery to the local foreign device (60).

Similarly, the remote controller (48) is operable to receive foreign information from the remote foreign channel (65) and produce one or more foreign packets in response to received foreign information. The remote controller (48) transmits foreign packets to the LPU (30) via the communications link (32), which may include transmitting foreign packets by interleaving foreign packets and DVI/HDMI response packets. In addition, remote controller (48) receives foreign packets from the remote link medium channel (47) and produces representative foreign information in response to the received foreign packet received from the LPU (30) from the local foreign device (60). The remote controller (48) outputs the representative foreign information to the remote foreign channel (65) for delivery to the remote foreign device (69).

It will be understood, however, that the system (59) of FIG. 13 is operable to communicate DVI/HDMI information in the manner described herein above in respect of the embodiment of FIG. 3.

Figure 14:
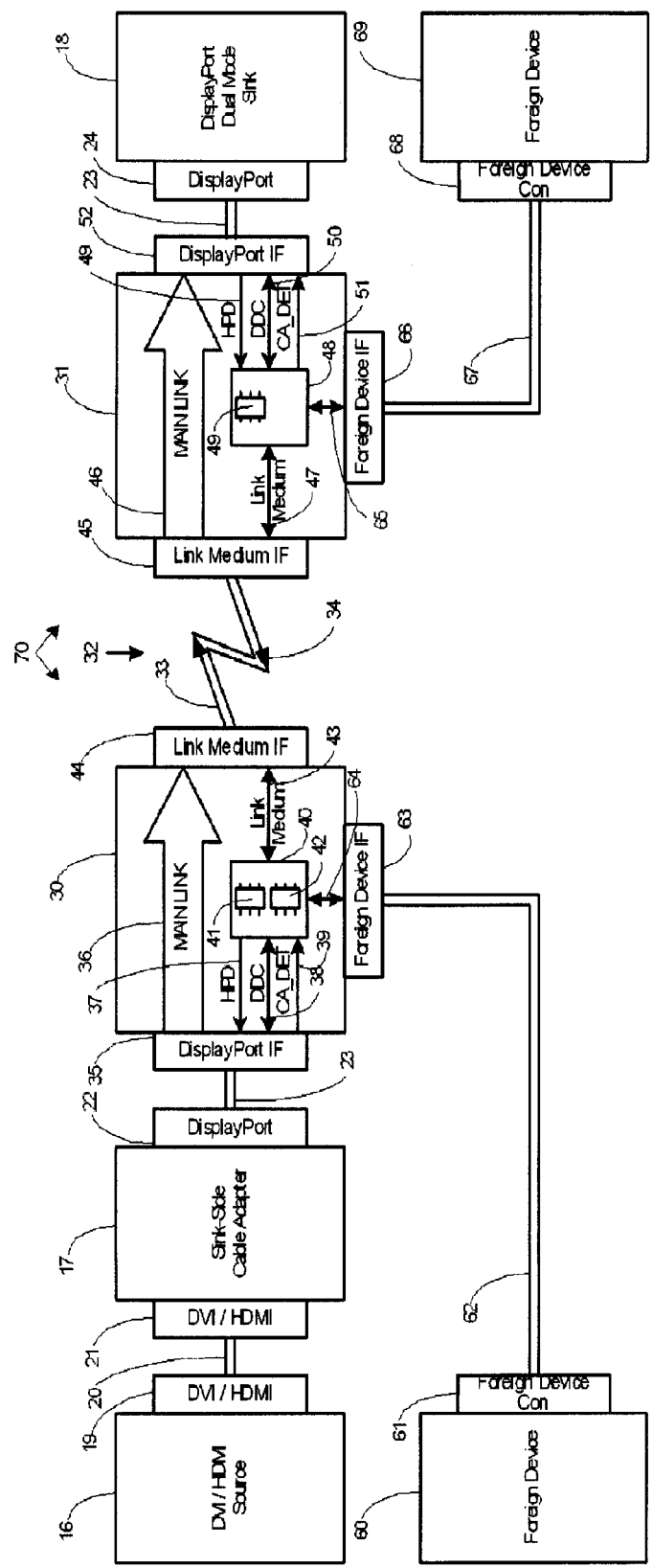
FIG. 14 is a block diagram of a system for communicating video information between a source device that is not compatible with the DisplayPort specifications and a sink device compatible with the DisplayPort Specifications across a duplex communication link wherein foreign data may be combined with the DisplayPort Dual-mode signals, according to the current invention.

FIG. 14 shows a system (70) demonstrating a further embodiment of the invention consisting of a DVI/HDMI source device (16), Sink-side cable adapter (17), LPU (30), communications link (32), RPU (31), and DisplayPort Dual-mode sink device (18) as configured in a similar form to the embodiment shown in FIG. 4. Additionally, the system (70) consists of a local foreign device (60) and remote foreign device (69). The LPU (30) is operable to connect to a local foreign device (60) having a local foreign device connector (61) for receiving a local foreign cable (62). The local foreign device (60) can be any system capable of electronic communications. The local foreign cable (62) is shown in FIG. 14 being attached to the local foreign interface (63) of the LPU (64). A local foreign channel (64) of the LPU (30) is operable to transfer foreign information between the local foreign interface (63) and the local controller (40).

Also a remote foreign channel (65) of the RPU (31) is connected between the remote controller (48) and a remote foreign interface (66) of the RPU (31). The remote foreign interface (66) is shown in FIG. 13 being attached to a remote foreign cable (67) which is received by the remote foreign device connector (68) of the remote foreign device (69).

As with the embodiment of the invention described in FIG. 13, communications between the local and remote foreign devices (60 & 69) are not limited to one-way communications. In some instances, the system (59) is operable to communicate foreign information via the communications link uni-directionally, uni-directionally in the opposite direction, or bi-directionally.

The system (70) is operable to communicate foreign information in the manner described herein above in respect to the third embodiment, the fourth embodiment, either or both of the third and fourth embodiment, or variations thereof for example.

It will again be understood, however, that the system (70) of FIG. 14 is operable to communicate DVI/HDMI information in the manner described herein above in respect of the embodiment of FIG. 4.

Figure 15:
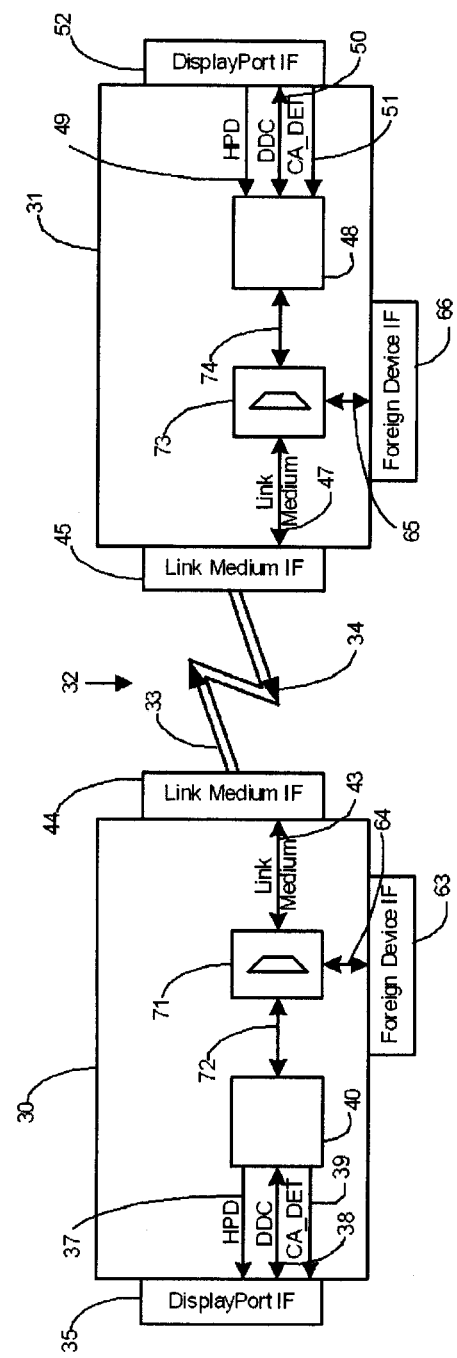
FIG. 15 is a block diagram of a system for multiplexing and de-multiplexing (interleaving) of foreign device information with the DisplayPort Dual-mode signals, according to the current invention.

The interleaving of foreign packets and DVI/HDMI request or response packets in the embodiments shown in FIGS. 13 and 14 shows one example where the local and remote controller (40 & 48) performed the multiplexing and de-multiplexing of the foreign information and DVI/HDMI information. FIG. 15 demonstrates an alternate method where the multiplexing and de-multiplexing of the foreign information and DVI/HDMI information is performed by a local and remote link medium controller (71 & 73). The local controller (40) creates and transmits request packets to a local dual-mode channel (72) connected to the local link medium controller (71). The local foreign device interface (63) is connected to the local link medium controller (71) by the local foreign channel (64). The local link medium controller (71) is operable by creating link medium packets consisting of foreign information and DVI/HDMI information to be outputted to the local link medium channel (43). These packets may be interleaved, in any known and suitable manner. These link medium packets are transferred to the remote unit (31) via the communications link (32) to be transmitted to the correct destination (foreign device (69) or sink device).

The local link medium controller (71) is also operable by receiving link medium packets and determining the destination of the contained information. Response packets are forwarded to the local controller (40) over the local dual-mode channel (72). Information destined for the local foreign device (60) is regenerated and outputted over the local foreign channel (64).

Conversely, the remote controller (48) creates and transmits response packets to a remote dual-mode channel (74) connected to the remote link medium controller (73). The remote foreign device interface (66) is connected to the remote link medium controller (73) by the remote foreign channel (65). The remote link medium controller (73) is operable by creating link medium packets consisting of foreign information and DVI/HDMI information to be outputted to the remote link medium channel (47). These packets may be interleaved. These link medium packets are transferred to the local unit (30) via the communications link (32) to be transmitted to the correct destination (foreign device (60) or source device). The remote link medium controller (73) is also operable by receiving link medium packets and determining the destination of the contained information. Request packets are forwarded to the remote controller (48) over the remote dual-mode channel (74). Information destined for the remote foreign device (69) is regenerated and outputted over the remote foreign channel (65).

Thus, it is apparent that there has been provided, in accordance with the present invention, a DisplayPort device which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

The invention claimed is:

1. A method for communicating DisplayPort dual-mode signals and information and for communicating foreign information from a foreign source device between an originating unit and a terminating unit across a dual simplex communications link, said method comprising:
   a) receiving at a local unit dual-mode signals from an originating unit;
   b) converting at said local unit said received dual-mode signals into one or a plurality of request data packets;
   c) transmitting at said local unit said one or a plurality of request data packets to a remote unit across said dual simplex communications link;
   d) receiving at said remote unit said transmitted one or a plurality of request data packets as one or a plurality of received request data packets;
   e) converting at said remote unit said one or a plurality of received request data packets into converted dual-mode signals;
   f) transmitting at said remote unit said converted dual-mode signals to a terminating unit;
   g) receiving at said remote unit dual-mode signals from said terminating unit;
   h) converting at said remote unit said received dual-mode signals into one or a plurality of response data packets;
   i) transmitting at said remote unit said one or a plurality of response data packets to said local unit across said dual simplex communications link;
   j) receiving at said local unit said transmitted one or a plurality of response data packets as one or a plurality of received response data packets;
   k) converting at said local unit said one or a plurality of received response data packets into converted dual-mode signals; and
   l) transmitting at said local unit said converted dual-mode signals to said originating unit,
and wherein said method further comprises:
   i) receiving at said local unit foreign information from a foreign source device;
   ii) converting at said local unit said received foreign information into one or a plurality of foreign request data packets;
   iii) transmitting at said local unit said one or a plurality of foreign request data packets to said remote unit across said dual simplex communications link;
   iv) receiving at said remote unit said transmitted one or a plurality of foreign request data packets as one or a plurality of received foreign request data packets;
   v) converting at said remote unit said one or a plurality of foreign received request data packets into converted foreign information;
   vi) transmitting at said remote unit said converted foreign information to a foreign destination device;
   vii) receiving at said remote unit foreign information from said foreign destination device;
   viii) converting at said remote unit said received foreign information into one or a plurality of foreign response data packets;
   vix) transmitting at said remote unit said one or a plurality of foreign response data packets to said local unit across said dual simplex communications link;
   x) receiving at said local unit said transmitted one or a plurality of foreign response data packets as one or a plurality of received foreign response data packets;
   xi) converting at said local unit said one or a plurality of foreign received response data packets into converted foreign information; and
   xii) transmitting at said local unit said converted foreign information to said foreign source device.

2. A method as in claim 1 wherein said originating unit and/or said terminating unit is a Dual-mode device, which device conforms to the DisplayPort Specifications and DisplayPort Interoperability Guidelines.

3. A method as in claim 1 wherein said originating unit is a DVI 1.0 or HDMI device with an attached Sink-Side Cable Adapter and/or said terminating unit is a DVI 1.0 or HDMI device with an attached Source-Side Cable Adapter, and wherein said device and/or said adapter conforms to the DisplayPort Specifications and DisplayPort Interoperability Guidelines.

4. A method as in claim 1 wherein said DisplayPort dual-mode signals and information comprise Hot Plug Detect, Cable Adapter Detect and Display Data Channel information.

5. A method as in claim 1 wherein one or a plurality of downstream request data packets are transmitted across a first simplex channel of said dual-simplex communications link and one or a plurality of upstream request data packets are transmitted across a second simplex channel of said dual-simplex communications link.

6. A method of claim 1 further comprising delaying a DDC response to a Dual-mode or DVI or HDMI source unit or Cable Adapter by clock stretching.

7. A method of claim 6 wherein clock stretching is implemented by:
   delaying the acknowledgement phase of a DDC transaction;
   delaying the beginning of a data phase after an acknowledgement phase of a DDC transaction; or
   delaying the acknowledgement phase and the beginning of a data phase after an acknowledgement phase of a DDC transaction.

8. A method of claim 1 further comprising upon connection to the Dual-mode environment, performing by said remote unit an operation to read static DVI or HDMI information from said terminating unit and transmitting said information to said local unit.

9. A method of claim 8 further comprising upon connection to the Dual-mode environment, performing by said local unit an operation of storing said static DVI or HDMI information received from said remote unit.

10. A method of claim 9 further comprising at said local unit, receiving a request from said originating unit for static DVI or HDMI information, determining that the information pertaining to said request is stored in local memory, selecting said pertinent information from said stored information and transmitting said selected information to said originating unit.

11. A method of claim 1 wherein said local unit and said remote unit detects the presence of a Dual-mode Cable adapter and transmits such information to said remote unit and said local unit.

12. A method of claim 1 wherein said remote unit detects the presence of a Dual-mode or DVI or HDMI sink unit and transmits such information to said local unit.

13. A system for communicating DisplayPort dual-mode signals and information and for communicating foreign information from a foreign source device between an originating unit and a terminating unit across a dual simplex communications link, said system comprising of:
   a) a local unit comprising a local controller operable to:
      a) receive from an originating unit dual-mode signals;
      b) convert said received dual-mode signals into one or a plurality of request data packets;
      c) transmit said one or a plurality of request data packets to a remote unit across said dual simplex communications link;
      d) receive one or a plurality of response data packets from said remote unit across said dual simplex communications link;
      e) convert said received one or a plurality of response data packets into converted dual-mode signals; and
      f) transmit said converted dual-mode signals to said originating unit, and
   b) a remote unit comprising a remote controller operable to:
      a) receive said one or a plurality of request data packets from said local unit across said dual simplex communications link;
      b) convert said received one or plurality of request data packets into converted dual-mode signals;
      c) transmit said converted dual-mode signals to a terminating unit;
      d) receive from said terminating unit dual-mode signals;
      e) convert said received dual-mode signals into said one or a plurality of response data packets; and
      f) transmit said one or a plurality of response data packets across said dual simplex communications link
   and wherein said local controller of said local unit is also operable to:
      i) receive foreign information from a foreign source device;
      ii) convert said received foreign information into one or a plurality of foreign request data packets;
      iii) transmit said one or a plurality of foreign request data packets to said remote unit across said dual simplex communications link;
      iv) receive transmitted one or a plurality of foreign response data packets as one or a plurality of received foreign response data packets;
      v) convert said one or a plurality of foreign received response data packets into converted foreign information; and
      vi) transmit said converted foreign information to said foreign source device, and
   said remote controller of said remote unit is also operable to:
      i) receive said transmitted one or a plurality of foreign request data packets as one or a plurality of received foreign request data packets;
      ii) convert said one or a plurality of foreign received request data packets into converted foreign information;
      iii) transmit said converted foreign information to a foreign destination device;
      iv) receive foreign information from said foreign destination device;
      v) convert received foreign information into said one or a plurality of foreign response data packets; and
      vi) transmit said one or a plurality of foreign response data packets to said local unit across said dual simplex communications link.

14. A system as in claim 13 wherein said originating unit and/or said terminating unit is a Dual-mode device, conforming to the DisplayPort Specifications and DisplayPort Interoperability Guidelines.

15. A system as in claim 13 wherein said originating unit is a DVI 1.0 or HDMI device with an attached Sink-Side Cable Adapter, and/or said terminating unit is a DVI 1.0 or HDMI device with an attached Source-Side Cable Adapter which device and adapter conform to the DisplayPort Specifications and DisplayPort Interoperability Guidelines.

16. A system as in claim 13 wherein said DisplayPort dual-mode signals comprise Hot Plug Detect, Cable Adapter Detect and Display Data Channel information.

17. A system as in claim 13 wherein one or a plurality of downstream request data packets are transmitted across a first simplex channel of said dual-simplex communications link and one or a plurality of upstream request data packets are transmitted across a second simplex channel of said dual-simplex communications link.

18. A system of claim 13 wherein said local controller is operable to operate a queue of memory of said local unit.

19. A system of claim 13 wherein said local controller is operable to select and output from said local unit, data selected from the group consisting of stored representative dual-mode information and received response data packet from said remote unit.

* * * * *